(12) United States Patent
Thakur

(10) Patent No.: US 10,606,520 B2
(45) Date of Patent: Mar. 31, 2020

(54) METHODS AND APPARATUS TO READ FROM A NONVOLATILE MEMORY DEVICE

(71) Applicant: Intel IP Corporation, Santa Clara, CA (US)

(72) Inventor: Sachin Thakur, Bangalore (IN)

(73) Assignee: Intel IP Corporation, Santa Clara, CA (US)

( * ) Notice: Subject to any disclaimer, the term of this patent is extended or adjusted under 35 U.S.C. 154(b) by 671 days.

(21) Appl. No.: 15/253,470

(22) Filed: Aug. 31, 2016

(65) Prior Publication Data

US 2018/0004419 A1 Jan. 4, 2018

(30) Foreign Application Priority Data

Jun. 29, 2016 (IN) .............................. 201641022224

(51) Int. Cl.
*G06F 3/06* (2006.01)
*G06F 11/10* (2006.01)
*G06F 11/14* (2006.01)
*G06F 11/22* (2006.01)

(52) U.S. Cl.
CPC .......... *G06F 3/0679* (2013.01); *G06F 3/0605* (2013.01); *G06F 3/0632* (2013.01); *G06F 11/1068* (2013.01); *G06F 11/1417* (2013.01); *G06F 11/2284* (2013.01); *G06F 11/2289* (2013.01)

(58) Field of Classification Search
CPC .. G06F 3/0679; G06F 11/1417; G06F 3/0632; G06F 3/0605; G06F 11/1068; G06F 11/2284; G06F 11/2289
See application file for complete search history.

(56) References Cited

U.S. PATENT DOCUMENTS

| | | | | |
|---|---|---|---|---|
| 2005/0097499 A1* | 5/2005 | Sun | ...................... | G06F 15/7867 326/38 |
| 2005/0102573 A1* | 5/2005 | Sun | ...................... | G06F 15/7842 714/30 |
| 2007/0291552 A1* | 12/2007 | Khatami | ................ | G11C 16/20 365/185.33 |
| 2016/0246672 A1* | 8/2016 | Yang | ................... | G06F 11/1068 |

OTHER PUBLICATIONS

D. V. D. Radha Devi, P. K. Kondugari, G. Basavaraju and S. L. Gangadharaiah, "Efficient implementation of memory controllers and memories and virtual platform," 2014 International Conference on Communication and Signal Processing, Melmaruvathur, 2014, pp. 1645-1648. (Year: 2014).*

* cited by examiner

*Primary Examiner* — Cynthia Britt
(74) *Attorney, Agent, or Firm* — Hanley, Flight & Zimmerman, PLLC

(57) ABSTRACT

A disclosed apparatus to access a nonvolatile memory includes a physical geometry selector to select a first assumed physical geometry of a nonvolatile memory from among a plurality of assumed physical geometries supported by a memory controller, an information supplier to supply information about the first physical geometry to a set of registers, and a boot up controller to cause the memory controller to access data in the nonvolatile memory. The memory controller to access data in the nonvolatile memory uses the information supplied to the set of registers. Example disclosed apparatus further include a feedback input to receive feedback from the memory controller.

20 Claims, 4 Drawing Sheets

METHODS AND APPARATUS TO READ FROM A NONVOLATILE MEMORY DEVICE

FIELD OF THE DISCLOSURE

The present disclosure relates generally to nonvolatile memory devices and, more particularly, to methods and apparatus to accurately read data from a nonvolatile memory device without knowing the physical geometry/layout of the nonvolatile memory device in advance.

BACKGROUND

Nonvolatile memory devices are capable of storing data for extended periods of time without needing to be powered to maintain such data storage. Information is written to a solid state memory device, such as a flash memory device, by changing the electrical characteristics of transistor-based memory cells to change how such memory cells react to applied voltages. The electrical characteristics of different memory cells in a solid state memory device persist over time and represent different binary bits that subsequently can be read a number of times during read operations.

Due to their persistent data storage properties, nonvolatile memories are often used to store firmware and software that is to persist in a device even when the device is powered down and power is not applied to the memory. In this manner, processor-based devices can use nonvolatile memories to store firmware and/or software that needs to be executed during a boot process to initialize one or more subsystems, operating systems, and/or system configurations.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
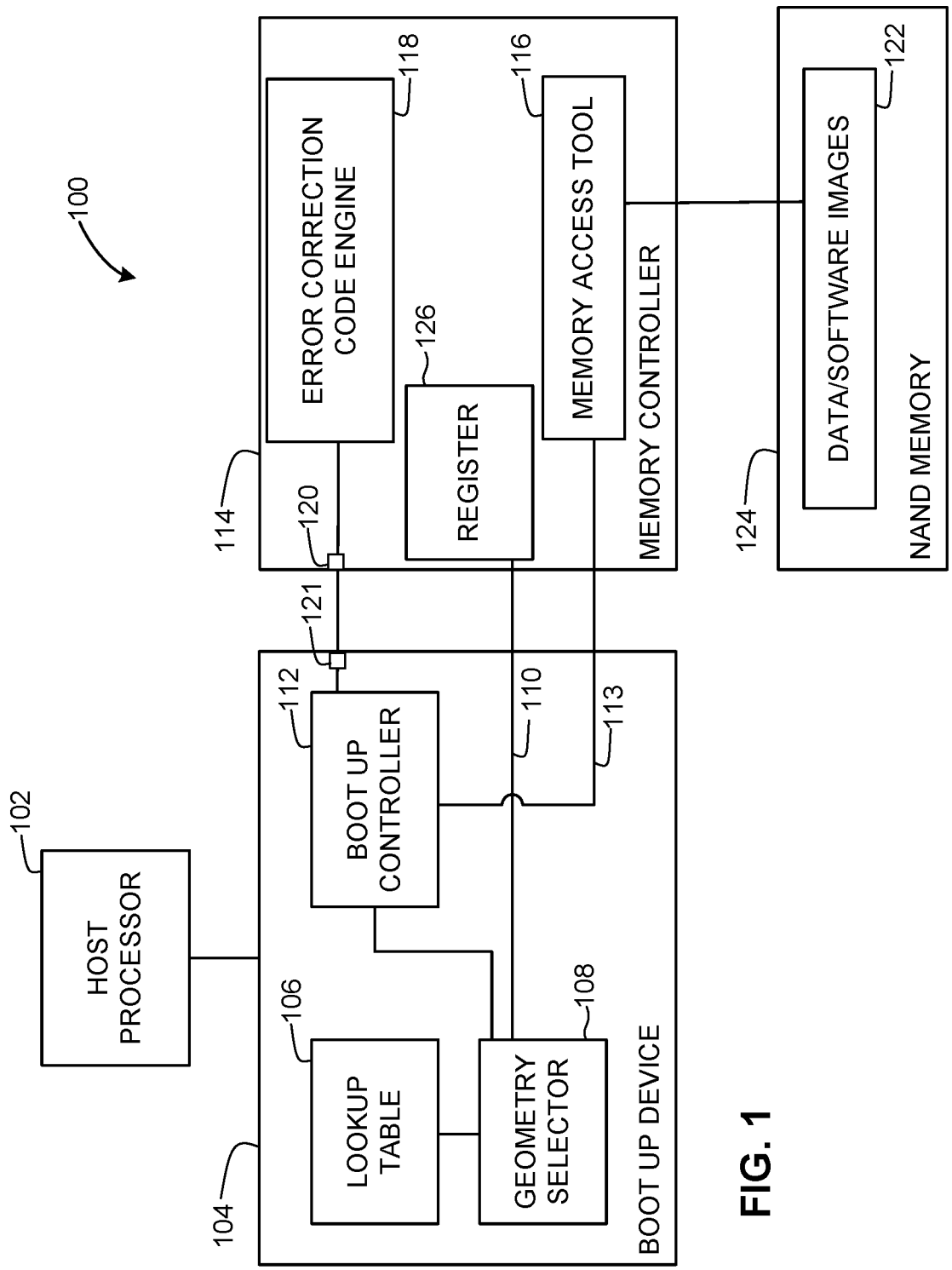
FIG. 1 is a block diagram illustrating an example processor boot up system having an example boot up device and an example nonvolatile memory.

Examples disclosed herein permit the boot up software images to be read from a nonvolatile memory without needing to know either the manufacturer or the device ID of the nonvolatile memory device. For example, examples disclosed herein may be used to implement bootrom software that is capable of loading software images from a NAND flash memory without needing to identify the exact NAND memory device (e.g., the manufacturer or the device ID). As such, examples disclosed herein improve hardware platforms by providing capabilities to boot from a greater number of NAND memory devices, including future-developed NAND memory devices, thereby extending the life cycle of hardware platforms.

As used herein, a bootrom is a read-only memory on a hardware platform that includes a minimum amount of software needed to load larger software images from other rewritable memory, such as NAND memory. As used herein, bootrom software implements a small program and resides in bootrom memory. Bootrom software is responsible for loading larger software images from other memory. As used herein, ECC is an error correction code used to identify when one or more bits of data read from a memory device contain an error. The terms error correction code and error correction code bits/bytes are used herein interchangeably. As used herein, an ECC byte is a checksum byte calculated by a hardware ECC engine to validate and even correct errors in data. As used herein, an ECC correction level identifies a maximum number of errors that can be corrected in a data segment. A data segment may be, for example, a byte (8 bits), a word (for example, 15 bits, 32 bits, 54 bits, etc.). As used herein, flashing software is software that executes on a computer to write software images onto a rewritable, nonvolatile memory in a hardware platform.

Memory devices are often designed and manufactured in accordance with industry standards. In the NAND memory space, loosely defined standards and lack of adoption of a common standard across different manufacturers has led to many NAND memory providers adopting different memory designs having different physical geometries and interface protocols. Conventional bootrom devices are programmed to load software images from a fixed number of NAND flash memories. Bootrom software installed on the bootrom device includes a look up table of NAND flash memory devices identified by manufacturer and device ID. For each respective manufacturer/device ID, a corresponding set of geometry/layout information is included. The geometry/layout information identifies the physical geometry/layout of the NAND flash memory having the respective manufacturer/device ID. The geometry/layout may identify a manner in which data stored on the memory device is organized. For example, the data is typically stored in data blocks, each block containing a specific number of data pages and each page including a "main area" having a specified size and a "spare area" having a specified size. The main area may be used to store data used to accomplish a task, e.g., software images, software code, etc., and the "spare area" may be used to stored bits/data used to perform error correction/verification.

To load software images from a NAND flash memory, the bootrom software is configured to identify the manufacturer and device ID of the NAND flash memory from which the software images are to be loaded. The manufacturer/device ID of each NAND flash memory is embedded in the NAND flash memory device. The bootrom software is also configured to find the identified manufacturer/device ID in the look up table and to capture the information for the corresponding physical geometry/layout information. The bootrom software supplies the corresponding physical geometry/layout information to a memory controller for use in accessing the NAND flash memory. The memory controller then uses the corresponding physical geometry/layout information to access the data/software images stored on the NAND flash memory.

Unfortunately, the bootrom device is a read-only memory device. Thus, the bootrom software, once installed, cannot be modified. As such the bootrom software is only able to operate a memory controller to load software images from the NAND flash devices that are included in the look up table of the bootrom software at the time that the bootrom software is installed. This is problematic because the bootrom device contains a limited storage area and, thus, the lookup table in the bootrom software is only able to include manufacturer/device ID and geometry/layout information for a limited number of NAND flash memory devices. Further, because the bootrom software cannot be modified, the bootrom device cannot operate with later-developed (and potentially more advanced) NAND devices.

Examples disclosed herein use NAND memory controllers to read NAND memory devices based on an assumed physical layout of such NAND memory devices, without knowing the actual physical layout of those devices. To accomplish such reading of NAND memory devices based on an assumed physical layout, examples disclosed herein use bootrom software having a look up table that identifies physical geometry/layout information for each of the possible physical geometry/layouts supported by the NAND memory controller. Thus, instead of including a look up table that identifies only a few specific NAND flash memory devices by manufacturer/device ID and corresponding geometry/layout information, the look up table embedded on the bootrom devices disclosed herein includes information identifying all physical geometries/layouts supported by the NAND flash controller used by the bootrom software without regard to manufacturer/device ID. Further the bootrom software is configured to select a first of the physical geometries/layouts from the look up table and to supply information for the selected physical geometry/layout to the NAND flash controller. In addition, the bootrom software instructs the NAND flash controller to access a chunk of the data stored on the NAND flash memory using the selected physical geometry/layout. Thus, the selected physical geometry/layout is assumed to be the actual physical geometry/layout of the NAND flash memory.

The data accessed by the NAND flash controller is used to generate a set of error correction codes. The error correction codes are analyzed and, if the error correction codes indicate that an error occurred when the data was accessed, the bootrom software selects another of the physical geometry/layouts from the lookup table and provides the corresponding information to the NAND memory controller with instructions to use the geometry/layout information to read the chunk of data on the NAND memory. The accessed data is used to generate another set of error correction codes. Again, the error correction codes are analyzed and, if the error correction codes indicate an error occurred during the data access operation, then the bootrom software selects yet another of the physical geometry/layouts stored in the look up table and the same operations are repeated. When the error correction codes instead indicate that an error did not occur when accessing the chunk of data, the bootrom software instructs the NAND memory controller to continue reading additional chunks of data from the NAND memory using the most recently selected physical geometry/layout (i.e., the physical geometry/layout that did not result in a data access error when used by the NAND memory controller to access data/software images stored on the NAND memory).

As described above and below, in some NAND memories, bytes of data are organized in groups referred to as "pages." In some examples, a chunk of data, as used herein, can be implemented with a page of data.

Thus, the bootrom device/software disclosed herein is able to operate a NAND memory controller to successfully access data/software images stored on a NAND memory device without knowing, in advance, the physical layout/geometry of the device and without regard to the manufacturer/device ID of the NAND memory device. As such, the bootrom device/software disclosed herein provides device manufacturers with the ability to use any NAND flash memory (currently existing or later developed) having a layout supported by the NAND memory controller without need to replace the bootrom device/software. The ability to use any such NAND flash memory, greatly enhances device design flexibility.

Referring now to the block diagram of FIG. 1, an example processor boot up system 100 includes an example host processor 102, an example bootrom (referred to herein as an example boot up device 104) having an example geometry/layout lookup table 106, an example geometry selector 108, an example data interface 110, an example boot up controller 112, and an example controller interface 113. In addition, the processor boot up system 100 includes an example memory controller 114, having an example memory access tool 116, error correction code engine 118, and an example error correction code output 120 that supplies information to an example boot up controller input 121. The memory controller 114 is configured to read/access data and software images 122 stored on an example nonvolatile memory 124. In some examples, the nonvolatile memory 124 is a NAND memory and the data/software images 122 contain information needed to perform a boot up of the host processor 102 and any peripherals coupled thereto (not shown).

In some examples, when initiating a boot up process, the host processor 102 accesses the boot up controller 112 in the boot up device 104. In response, the boot up controller 112 performs an example set of boot up operations. In some such examples, the boot up operations include causing the example data/software images 122 stored on the example NAND memory 124 to be accessed/loaded. The example data/software images 122 to be accessed/loaded include boot up information and boot up software images that are then executable by the host processor 102 to bring the host processor 102 to an operational state (e.g., booted up).

In some examples, the set of boot up operations performed by the boot up controller 112 include causing the example geometry selector 108 to select a first physical geometry/layout from among an example set of physical geometries/layouts contained in the look up table 106. As used herein, the terms "physical geometries/layouts" refers to the physical geometries/layouts of nonvolatile memories. The example set of physical geometries/layouts contained in the look up table 106 preferably includes all of the physical geometries/layouts supported by the memory controller 114. (As is conventional, existing memory controllers are configured to support (e.g., access/read data from) NAND flash memories having a limited number of physical geometries/layouts.) Upon selecting a first of the physical geometries/layouts, the geometry selector 108 supplies information corresponding to the first physical geometry/layout (also contained in the look up table 106) to an example set of registers 126 residing in the memory access controller 114. In some examples, the geometry selector 108 supplies the information corresponding to the first physical geometry/layout using the example data interface 110. In addition, the boot up controller 112 instruct the example memory access tool 116 to use the information stored in the set of registers 126 to access/read a chunk of the data/software images 122 stored in the NAND memory 124. In some examples, the boot up controller 112 instructs the memory access tool 116 to access/read a chunk of the data/software images via the example controller interface 113. In this manner, the first physical geometry/layout is "assumed" to be the actual physical geometry/layout of the NAND memory 124. Hereinafter, the first physical geometry/layout is referred to as the first assumed physical geometry/layout.

In some examples, upon accessing/reading the chunk of data based on the first assumed physical geometry/layout, the example memory access tool 116 supplies the accessed/read chunk of data to the example error correction code engine 118. The error correction code engine 118 uses a first portion of the chunk of data to generate a first set of error codes. The error correction code engine then compares the first set of error correction codes to an assumed second set of error correction codes contained in a second portion of the chunk of data. If the first and second sets of error correction codes match, then the error correction code supplies a first signal indicating that a read/access error was not encountered when the first chunk of data was read from the NAND memory 124 via the example error correction code output 120 to the boot up controller 112 via the boot up controller input 121. When a read/access error is not encountered when the first chunk of data is read, the first assumed physical geometry/layout is the actual physical geometry/layout of the NAND memory 124. Thus, responsive to the signal, the boot up controller 112 instructs the example memory access tool 116 to continue reading additional chunks of data from the NAND memory 124 based on the first physical geometry/layout.

In some examples, the example error correction code engine 118 determines that the first and second sets of error correction codes do not match, thereby indicating that a read/access error occurred when the example memory access tool 116 attempted to read the chunk of data based on the first assumed physical geometry/layout. As a result, the first physical geometry/layout is no longer assumed to be the actual geometry/layout of the NAND memory 124. In some such examples, the error correction code engine 118 supplies, via the example error correction code output 120, a signal indicating that a read/access error was encountered when the first chunk of data was read from the NAND memory 124 to the example boot up controller input 121. Responsive to the signal, the boot up controller 112 causes the example geometry selector 108 to a select a second physical geometry/layout from the example look up table 106. The geometry selector supplies information from the look up table 106 identifying the second physical geometry/layout to the example set of registers 126. In addition, the boot up controller 112 instructs the example memory access tool 116 to read/access a chunk of data from the NAND memory 124 using the information contained in the set of registers 126. Thus, the second physical geometry/layout is assumed to be the actual physical geometry/layout of the NAND memory 124. The memory access tool 116 reads/accesses the chunk of data and supplies the data to the error correction code engine 118. The error correction code engine uses a first portion of the data to generate a third set of error correction codes and then compares the third set of error corrections codes to a set of bits assumed to represent a fourth set of error correction codes residing in a second portion of the chunk of data. If the third error correction codes match the set of bits assumed to represent a fourth set of error correction codes, then a read/access error was not encountered such that the second assumed physical geometry/layout is the actual physical geometry layout of the NAND memory 124. If the third error correction codes do not match, then a read/access error was encountered such that the second assumed physical geometry/layout is not the actual physical geometry layout of the NAND memory 124.

The error correction code engine 118 supplies the outcome of the comparison to the boot up controller which responds by instructing the memory access tool 116 to continue accessing the NAND memory 124 based on the second physical geometry/layout or by instructing the geometry selector 108 to select another of the plurality of physical geometries/layouts contained in the lookup table 106. Thus, the boot up device 104 of the processor boot up system 100 continues to select different physical geometries/layouts for use in accessing the data/software images stored on the NAND memory 124 until a selected one of the physical geometries/layouts is determined to be the actual physical geometry/layout of the NAND memory 124.

Figure 2:
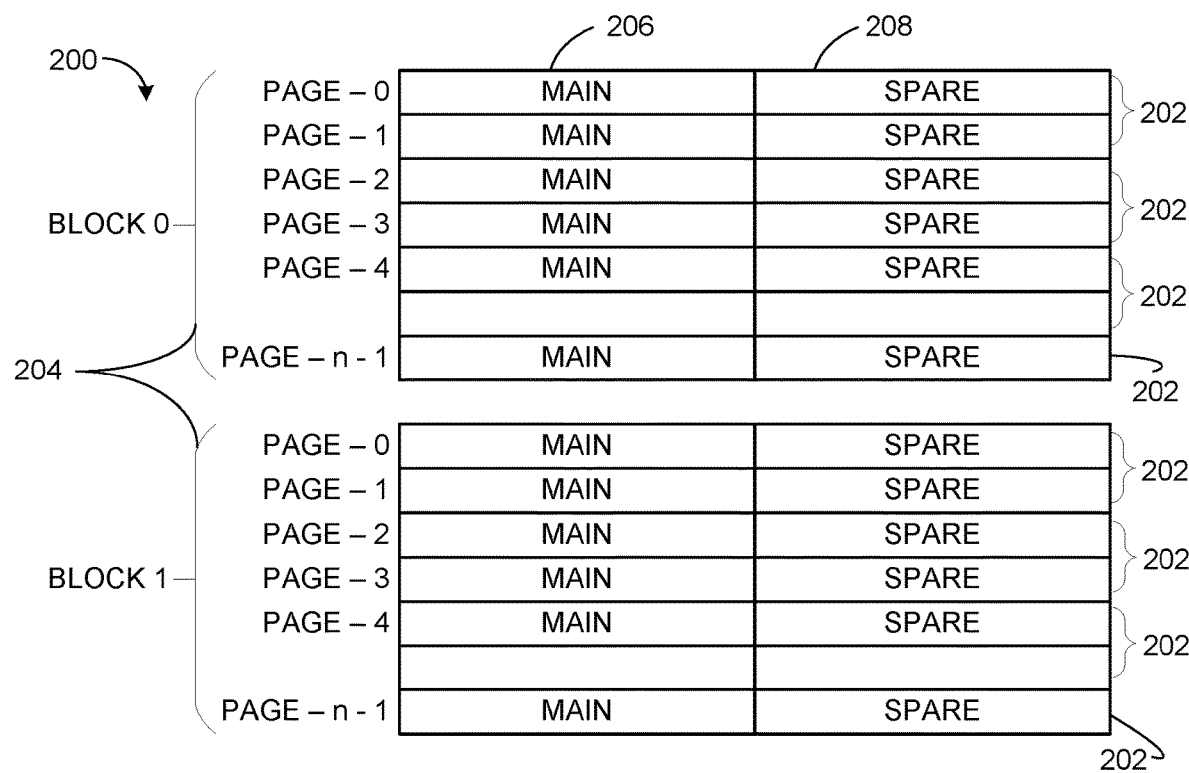
FIG. 2 illustrates an example physical geometry/layout of a nonvolatile memory.

FIG. 2 illustrates an example physical memory/layout 200 illustrating how data/information is organized on an example NAND memory 124. As shown, the physical memory geometry/layout 200 is typically organized in groups of data referred to as pages 202. Further multiple pages of data are organized in groups referred to as blocks 204. Each of the pages of data includes a main area 206 and a spare area 208. Data stored in the main area 206 includes data to be used in the boot up process. Data stored in the spare area 208 includes error correction information and may additionally include other information that can be used to ensure/test the integrity of the data in the main area 206. In some examples, the error correction code information includes ECC bytes, an ECC correction level, an error correction code byte offset. As described above, ECC bytes are checksum bytes used by the hardware ECC engine to validate and correct errors in the data. As further described above, the ECC bytes stored in a spare area of a page are calculated based on the bits/bytes of data stored in the corresponding main area. Thus, the integrity of the bits/bytes of data read from a main area of a page can be used to calculate a set of ECC bytes which can then be compared to the ECC bytes stored in the corresponding spare area. If there is a match, then the integrity of the data stored in the main area is confirmed. If there is not a match, then the integrity of the data stored in the main area is not confirmed. In some examples, the error correction code byte offset indicates a number of bytes that the ECC bytes are offset from an initial bit position.

As described above, the example physical geometry/layout 200 of FIG. 2 illustrates, generally, how data is organized on a typical nonvolatile memory (e.g., the example NAND memory 124). However, the dimensions of the various components of the physical geometry/layout of NAND memories will vary in size. For example, the size of the main area will vary by NAND memory device, the size of the spare area will vary by NAND memory device, the number of pages will vary by NAND memory device and the number of blocks will vary by NAND memory device. Thus, in order for the example memory controller 114 of FIG. 1 to be able to properly read/access data stored on the NAND memory 124, the memory controller 114 needs to be supplied with information identifying the exact dimensions of the organizational components (e.g., main area, spare area, pages, blocks) of the NAND memory. Thus, the physical layout/geometry is used to refer to any such dimensional information needed for the memory controller 114 to properly read from the NAND memory 124.

Figure 3:
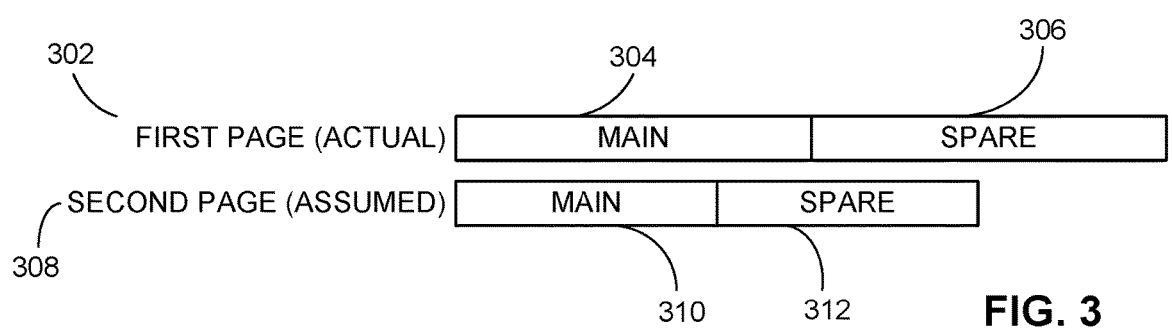
FIG. 3 illustrates two example physical geometry/layouts having different dimensions.

FIG. 3 illustrates a layout of an example first page of data 302 having a first main area 304 and a first spare area 306 and further illustrates a layout of an example second page of data 308 having a second main area 310 and a second spare area 312. For illustrative purposes, the first page of data 302 represents the actual geometry of the main and spare areas of the pages of the example NAND memory 124 (see FIG. 1) and the second page of data represents an assumed physical geometry/layout of the NAND memory 124. Further, the assumed physical geometry/layout 308 is selected by the example geometry selector 108 (see FIG. 1) and information identifying the size of the second main area and the second spare area are supplied to the example memory access tool 116 (see FIG. 1). Using the assumed physical geometry/layout 308 when reading/accessing data from the NAND memory 124, the example error correction code engine 118 will proceed to treat bytes that are actually stored in the first main area 304 in the first (and actual) physical geometry/layout 302 as ECC bytes when, in fact, the bytes are not ECC bytes but are instead data/software information used to perform boot up operations. As a result, the error correction codes calculated by the error correction engine 118 will be based on the bytes stored in the second (assumed) main area 310 of the NAND memory 124 and will therefore not match the error correction codes stored in the second (assumed) spare area 312 of the NAND memory 124. Thus, the error correction code engine 118 is used to verify the integrity of the data stored on the NAND memory 124 and is also used to determine when an assumed physical geometry/layout matches an actual physical geometry/layout.

While an example manner of implementing the processor boot up system 100 is illustrated in FIG. 1, one or more of the elements, processes and/or devices illustrated in FIG. 1 may be combined, divided, re-arranged, omitted, eliminated and/or implemented in any other way. Further, the host processor 102, the example boot up device 104, the example look up table 106, the example geometry selector 108, the example data interface 110, the example boot up controller 112, the example controller interface 113, the example memory controller 114, the example memory access tool 116, the example error correction code engine 118, the example error correction code output 120, the example boot up controller input 121, the example data/software images 122, the example NAND memory 124 and/or, more generally, the example processor boot up system 100 of FIG. 1 may be implemented by hardware, software, firmware and/or any combination of hardware, software and/or firmware. Thus, for example, any of the host processor 102, the example boot up device 104, the example look up table 106, the example geometry selector 108, the example data interface 110, the example boot up controller 112, the example controller interface 113, the example memory controller 114, the example memory access tool 116, the example error correction code engine 118, the example error correction code output 120, the example boot up controller input 121, the example data/software images 122, the example NAND memory 124, and/or, more generally, the example processor boot up system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the host processor 102, the example boot up device 104, the example look up table 106, the example geometry selector 108, the example data interface 110, the example boot up controller 112, the example controller interface 113, the example memory controller 114, the example memory access tool 116, the example error correction code engine 118, the example error correction code output 120, the example boot up controller input 121, the example data/software images 122, the example NAND memory 124, is/are hereby expressly defined to include a tangible computer readable storage device or storage disk such as a memory, a digital versatile disk (DVD), a compact disk (CD), a Blu-ray disk, etc. storing the software and/or firmware. Further still, the example processor boot up system 100 of FIG. 1 may include one or more elements, processes and/or devices in addition to, or instead of, those illustrated in FIG. 1, and/or may include more than one of any or all of the illustrated elements, processes and devices.

Figure 4:
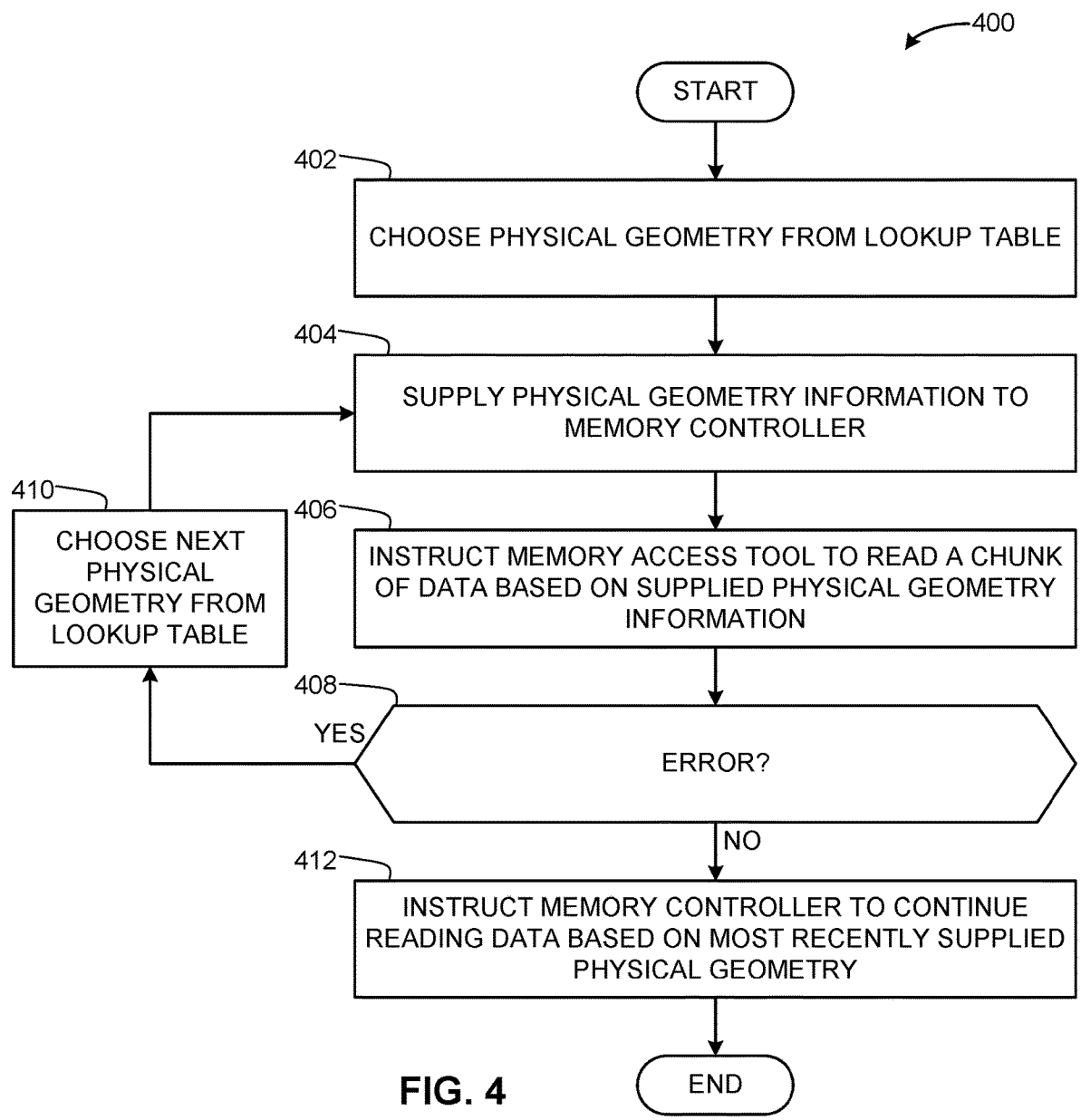
FIG. 4 depicts an example flow diagram representative of machine readable instructions that may be executed to implement the example processor boot up system of FIG. 1.

A flowchart representative of example machine readable instructions for implementing the processor boot up system 100 of FIG. 1 is shown in FIG. 4. In this example, the machine readable instructions comprise a program for execution by a processor such as the processor 512 shown in the example processor platform 500 discussed below in connection with FIG. 5. The program may be embodied in software stored on a tangible computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 4, many other methods of implementing the example processor boot up system 100 may alternatively be used. For example, the order of execution of the blocks may be changed, and/or some of the blocks described may be changed, eliminated, or combined.

As mentioned above, the example processes of FIG. 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIG. 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 4 illustrates an example method 400 performed by the processor boot up system 100 of FIG. 1. The example method 400 begins at a block 402 at which the example boot up controller 112 (see FIG. 1) causes the example geometry selector 108 (see FIG. 1) to select a first assumed physical geometry/layout from the example look up table 106. The geometry selector 108 and/or the boot up controller 112 supply information about the first assumed physical geometry/layout (including, for example, the sizes of a main area, a spare area, a page, a block, ECC information, etc.) to the set of registers 126 (see block 404). The boot up controller 112 instructs the example memory access tool 116 (see FIG. 1) to read/access a chunk of data (e.g., a page of data) based on the information (e.g., the first assumed physical geometry/layout) supplied to the set of registers 126 (block 406). The example error correction code engine 118 uses the chunk of data read/accessed by the memory access tool 116 to determine whether an error occurred when the read/access of the chunk of data was attempted (block 408). In some examples, the error correction code engine 118 determines whether an error occurred by calculating/generating a first set of error correction codes and comparing the first set of error correction codes to a set of bits contained in the data accessed by the memory access tool 116 and assumed to represent a second set of error correction codes. If the first and second sets of error correction codes do not match, a read/access error occurred thereby indicating that the first assumed physical geometry/layout is not the actual physical geometry layout of the NAND memory 124. As a result, the geometry selector 108 selects a second assumed physical geometry/layout from the look up table 106 (see block 410) and the method returns to the block 404 and block subsequent thereto.

If the first and second sets of error correction codes do match, a read/access error did not occur thereby indicating that the first assumed physical geometry/layout is indeed the actual physical geometry layout of the NAND memory 124. As a result, the example boot up controller 112 instructs the memory access tool 116 to continue reading the NAND memory 124 using the first (confirmed to be actual) physical geometry/layout (see block 412) and the method ends.

Figure 5:
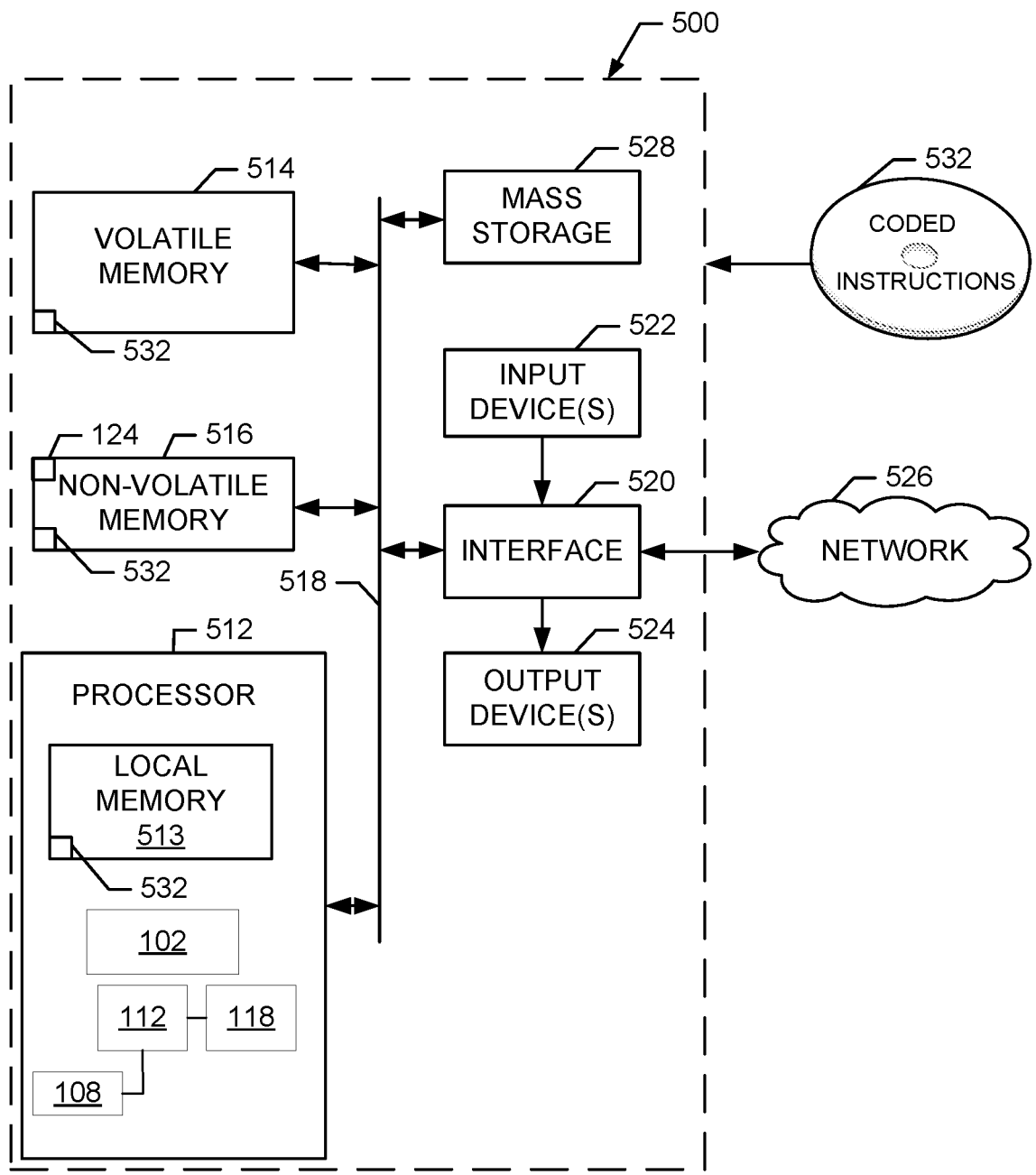
FIG. 5 is an example processor platform capable of executing the example computer readable instructions represented by FIG. 4 to implement the example processor boot up system of FIG. 1.

FIG. 5 is a block diagram of an example processor platform 500 capable of executing the instructions of FIG. 4 to implement the processor boot up system 100 of FIG. 1. The processor platform 500 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 500 of the illustrated example includes a processor 512. The processor 512 of the illustrated example is hardware. In some examples, the processor 500 is used to implement the host processor 102 (see FIG. 1). For example, the processor 512 can be implemented by one or more integrated circuits, logic circuits, microprocessors or controllers from any desired family or manufacturer.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. In some examples, the non-volatile memory 516 is used to implement the NAND memory 124. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface. The example data interface 110, the example error correction code output 120, the example boot up controller input 121, and the example controller interface 113 can be implemented using the interface circuit 520.

In the illustrated example, one or more input devices 522 are connected to the interface circuit 520. The input device(s) 522 permit(s) a user to enter data and commands into the processor 512. The input device(s) can be implemented by, for example, an audio sensor, a microphone, an image sensor (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1020 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

The coded instructions 532 of FIG. 4 may be stored in the mass storage device 528, in the volatile memory 514, in the non-volatile memory 516, and/or on a removable tangible computer readable storage medium such as a CD or DVD. In some examples, the coded instructions may be used to implement the example boot up controller 112, the example geometry selector 108, and the example look up table 106. In some examples, all or portions of the example boot up controller 112, the example geometry selector 108, and the example error correction code engine 118 are implemented using the processor 512.

From the foregoing, it will be appreciated that the above disclosed methods, apparatus and articles of manufacture permit a bootrom device to operate a NAND memory controller to read data from a NAND memory device without having advance knowledge as to the physical geometry/layout of the NAND memory device. As such, hardware designers have greater flexibility in choosing NAND memory devices to use for storage of boot up software data and images. In addition, the need to modify hardware (e.g., the bootrom device and bootrom software) is greatly reduced. Although the embodiments disclosed herein are described, in large part as being useful for reading NAND memory devices. The embodiments and technologies disclosed herein are useful for reading any type of nonvolatile memory and are especially useful for nonvolatile memories having physical geometries/layouts that have not been standardized.

A plurality of example methods, apparatus, and machine readable mediums are disclosed herein. Example no. 1 is a method that includes supplying first information identifying a first assumed physical geometry of the nonvolatile memory to a memory controller, causing the memory controller to read data stored on the nonvolatile memory based on the first assumed physical geometry of the nonvolatile memory, and supplying second information identifying a second assumed physical geometry to the memory controller, in response to an input indicating an error occurred when the memory controller read the nonvolatile memory.

Example no. 2 is a method that includes the method of example no. 1. In example no. 2, the data is a first chunk of data containing a first number of bytes, and the method of example no. 2 further includes causing the memory controller to read a second chunk of data containing a second number of bytes stored on the nonvolatile memory based on the second assumed physical geometry of the nonvolatile memory.

Example no. 3 is a method that includes the method of example no. 1. In example no. 3, the input is a first input and the method of example no. 3 also includes causing the memory controller to continue reading additional data from the nonvolatile memory using the first assumed physical geometry, in response to a second input indicating the error did not occur when reading the nonvolatile memory.

Example no. 4 is a method that includes the method of example no. 1. In example no. 4, the input indicating an error occurred when the memory controller read the nonvolatile memory is based on a set of error correction codes.

Example no. 5 is a method that includes the method of example no. 1. In example no. 5, information identifying a plurality of assumed physical geometries supported by the memory controller, including the first assumed physical geometry and the second assumed physical geometry, are contained in a lookup table.

Example no. 6 is a method that includes the method of example no. 5. In example no. 6, the lookup table further contains respective error correction code levels and respective error correction code byte offsets corresponding to each of the plurality of assumed physical geometries.

Example no. 7 is a method that includes the method of the example no. 1. In example no. 7, the data stored on the nonvolatile memory is organized into pages containing main areas for storing boot up software and spare areas for storing error correction code information.

Example no. 8 is a method that includes the method of example no. 1. In example no. 8, the nonvolatile memory is a NAND flash memory and the memory controller is a NAND flash memory controller.

Example no. 9 is a method that includes any of the methods of example no. 2 and example no. 3. In example no. 9, the input indicating an error occurred when the memory controller read the nonvolatile memory is based on a set of error correction codes.

Example no. 10 is a method that includes any of the methods of example nos. 2, 3, or 4. In example no. 10, information identifying a plurality of assumed physical geometries of the nonvolatile memory, including the first assumed physical geometry and the second assumed physical geometry, are contained in a lookup table. The plurality of assumed physical geometries are geometries that are supported by the memory controller.

Example no. 11 is a method that includes the method of example no. 10. In example no. 11, the lookup table further contains respective error correction code levels and respective error correction code byte offsets corresponding to each of the plurality of assumed physical geometries.

Example no. 12 is a method that includes any of the methods of example nos. 1, 2, 3, 4, 5, 6, or 7. In example no. 12, the nonvolatile memory is a NAND flash memory and the memory controller is a NAND flash memory controller.

Example no. 13 is a method that includes the methods of example no. 1 or example no. 2. In example no. 13, the input is a first input. The method of example no. 13 further includes causing the memory controller to read additional data from the nonvolatile memory using the first assumed physical geometry, in response to a second input indicating the error did not occur when reading the nonvolatile memory.

Example no. 14 is an apparatus that includes means to perform any of the methods of example nos. 1-13.

Example no. 15 is a machine-readable storage medium storing machine-readable instructions which, when executed, cause the machine to implement a method or realize an apparatus of any of the preceding examples.

Example no. 16 is an apparatus to access a nonvolatile memory. The apparatus includes a physical geometry selector to select a first assumed physical geometry of a nonvolatile memory from among a plurality of assumed physical geometries supported by a memory controller. The apparatus also includes an information supplier to supply information about the first physical geometry to a set of registers and a boot up controller to cause the memory controller to access data in the nonvolatile memory. In example no. 16, the memory controller accesses data in the nonvolatile memory using the information supplied to the set of registers. The apparatus further includes a feedback input to receive feedback from the memory controller.

Example no. 17 is the apparatus of example no. 16. In example no. 17, the feedback input receives feedback from the memory controller indicating whether accessing the data in the nonvolatile memory resulted in an error.

Example no. 18 is the apparatus of example no. 17. In the apparatus of example no. 18, the physical geometry selector also selects a second assumed physical geometry of the nonvolatile memory from among the plurality of assumed physical geometries when the feedback input receives feedback indicating that accessing the data resulted in an error.

Example no. 19 is the apparatus of example no. 16 and also includes a lookup table containing the information identifying the plurality of assumed physical geometries.

Example no. 20 is the apparatus of the example no. 19. In example no. 20, the information identifying the plurality of assumed physical geometries includes, for corresponding ones of the assumed physical geometries, an error correction code correction level and an error correction code byte offset, a page size, a main area size and a spare area size.

Example no. 21 is the apparatus of example no. 16, and in example no. 21, the nonvolatile memory is a NAND flash memory and the memory controller is a NAND flash memory controller.

Example no. 22 is the apparatus of any of example nos. 16, 17, or 18, and the apparatus of example no. 22 also includes a lookup table containing the information identifying the plurality of assumed physical geometries.

Example no. 23 is the apparatus of example no. 22, and in example no. 23, the information identifying the plurality of assumed physical geometries includes, for corresponding ones of the assumed physical geometries, an error correction code correction level and an error correction code byte offset, a page size, a main area size and a spare area size.

Example no. 24 is the apparatus of any of example nos. 16-20, and in example no. 24 the nonvolatile memory is a NAND flash memory and the memory controller is a NAND flash memory controller.

Example no. 25 is an apparatus that includes means to supply first information identifying a first assumed physical geometry of the nonvolatile memory to a memory controller. The apparatus also includes means to cause the memory controller to read data stored on the nonvolatile memory based on the first assumed physical geometry of the nonvolatile memory. In addition, the apparatus includes means to supply second information identifying a second assumed physical geometry to the memory controller in response to an input indicating an error occurred when the memory controller read the nonvolatile memory.

Example no. 26 is the apparatus of example no. 25 and in example no. 26, the data is a first chunk of data containing a first number of bytes. The apparatus of example no. 26 also includes means to cause the memory controller to read a second chunk of data containing a second number of bytes stored on the nonvolatile memory based on the second assumed physical geometry of the nonvolatile memory.

Example no. 27 is the apparatus of example no. 25 or example no. 26 and in example no. 27, the input is a first input. The apparatus of example no. 27 also includes means to cause the memory controller to continue reading additional data from the nonvolatile memory using the first assumed physical geometry in response to a second input indicating the error did not occur when reading the nonvolatile memory.

Example no. 28 is the apparatus of any of examples, 25-27, and in example no. 28, the nonvolatile memory is a NAND flash memory and the memory controller is a NAND flash memory controller.

Example no. 29 is a tangible machine readable medium having instructions that, when executed, cause the machine to at least supply first information identifying a first assumed physical geometry of a nonvolatile memory to a memory controller. Example no. 29 also includes instructions to cause the memory controller to read a first chunk of data from the nonvolatile memory and supply second information identifying a second assumed physical geometry of the nonvolatile memory to the memory interface responsive to a first input signal. Example no. 29 also includes instructions to cause the memory controller to read additional chunks of data from the nonvolatile memory based on the first assumed physical geometry responsive to a second input signal.

Example no. 30 is the tangible machine readable medium of example no. 29, and in example no. 30, the first input signal indicates that the nonvolatile memory does not have the first assumed physical geometry.

Example no. 31 is the tangible machine readable medium of example no. 29 and in example no. 31, the second input signal indicates that the nonvolatile memory has the first assumed physical geometry.

Example no. 32 is the tangible machine readable medium of example no. 29 and in example no. 32, the nonvolatile memory is a NAND flash memory and the memory controller is a NAND flash memory controller.

Example no. 33 is the tangible machine readable medium of example no. 29, and in example no. 33, the chunk of data is a page of data.

Example no. 34 is the tangible machine readable medium of example no. 29 and example no. 34 also includes instructions to cause the machine to access a lookup table containing information identifying a plurality of assumed physical geometries of the nonvolatile memory, including the first assumed physical geometry and the second assumed physical geometry, supported by the memory controller.

Example no. 35 is the tangible machine readable medium of example no. 34, and in example no. 35, the first input signal indicates that the nonvolatile memory does not have the first assumed physical geometry, and the second input signal indicates that the nonvolatile memory has the first assumed physical geometry.

Example no. 36 is the tangible machine readable medium of any example nos. 29, 34, or 35, and in example no. 36, the nonvolatile memory is a NAND flash memory and the memory controller is a NAND flash memory controller.

Example no. 37 is the tangible machine readable medium of any of example nos. 29, 34, 35 or 36, and in example no. 37, the chunk of data is a page of data.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to access a nonvolatile memory, the apparatus comprising:
    a physical geometry selector to select a first assumed physical geometry of a nonvolatile memory from among a plurality of assumed physical geometries supported by a memory controller;
    an information supplier to supply information about the first physical geometry to a set of registers;
    a boot up controller to cause the memory controller to access data in the nonvolatile memory, the memory controller to access data in the nonvolatile memory using the information supplied to the set of registers; and
    a feedback input to receive feedback from the memory controller.

2. The apparatus as defined in claim 1, wherein the feedback input receives feedback from the memory controller indicating whether accessing the data in the nonvolatile memory resulted in an error.

3. The apparatus as defined in claim 2, wherein the physical geometry selector is further to select a second assumed physical geometry of the nonvolatile memory from among the plurality of assumed physical geometries when the feedback input receives feedback indicating that accessing the data resulted in an error.

4. The apparatus as defined in claim 1, further including a lookup table containing the information identifying the plurality of assumed physical geometries.

5. The apparatus as defined in claim 4, wherein the information identifying the plurality of assumed physical geometries includes, for corresponding ones of the assumed physical geometries, an error correction code correction level and an error correction code byte offset, a page size, a main area size and a spare area size.

6. The apparatus as defined in claim 1, wherein the nonvolatile memory is a NAND flash memory and the memory controller is a NAND flash memory controller.

7. At least one non-transitory computer readable medium comprising instructions, the instructions, when executed, to cause a machine to at least:
    supply first information identifying a first assumed physical geometry of a nonvolatile memory to a memory controller;

cause the memory controller to read a first chunk of data from the nonvolatile memory;

responsive to a first input signal, supply second information identifying a second assumed physical geometry of the nonvolatile memory to the memory interface; and responsive to a second input signal, cause the memory controller to read additional chunks of data from the nonvolatile memory based on the first assumed physical geometry.

8. The at RAM least one non-transitory computer readable medium as defined in claim 7, wherein the first input signal indicates that the nonvolatile memory does not have the first assumed physical geometry.

9. The at RAM least one non-transitory computer readable medium as defined in claim 8, wherein the second input signal indicates that the nonvolatile memory has the first assumed physical geometry.

10. The at RAM least one non-transitory computer readable medium as defined in claim 7, wherein the nonvolatile memory is a NAND flash memory and the memory controller is a NAND flash memory controller.

11. The at RAM least one non-transitory computer readable medium as defined in claim 7, wherein the chunk of data is a page of data.

12. The at least one non-transitory computer readable medium as defined in claim 7, further including instructions to cause the machine to access a lookup table containing information identifying a plurality of assumed physical geometries of the nonvolatile memory, including the first assumed physical geometry and the second assumed physical geometry, supported by the memory controller.

13. A method to read from a nonvolatile memory, the method comprising:

supplying first information identifying a first assumed physical geometry of the nonvolatile memory to a memory controller;

causing the memory controller to read data stored on the nonvolatile memory based on the first assumed physical geometry of the nonvolatile memory; and in response to an input indicating an error occurred when the memory controller read the nonvolatile memory, supplying second information identifying a second assumed physical geometry to the memory controller.

14. The method as defined in claim 13, wherein the data is a first chunk of data containing a first number of bytes, the method further comprising causing the memory controller to read a second chunk of data containing a second number of bytes stored on the nonvolatile memory based on the second assumed physical geometry of the nonvolatile memory.

15. The method as defined in claim 13, wherein the input is a first input, the method further including, in response to a second input indicating the error did not occur when reading the nonvolatile memory, causing the memory controller to continue reading additional data from the nonvolatile memory using the first assumed physical geometry.

16. The method as defined in claim 13, wherein the input indicating an error occurred when the memory controller read the nonvolatile memory is based on a set of error correction codes.

17. The method as defined in claim 13, wherein information identifying a plurality of assumed physical geometries supported by the memory controller, including the first assumed physical geometry and the second assumed physical geometry, are contained in a lookup table.

18. The method as defined in claim 17, wherein the lookup table further contains respective error correction code levels and respective error correction code byte offsets corresponding to each of the plurality of assumed physical geometries.

19. The method as defined in claim 13, wherein the data stored on the nonvolatile memory is organized into pages containing main areas for storing boot up software and spare areas for storing error correction code information.

20. The method as defined in claim 13 wherein the nonvolatile memory is a NAND flash memory and the memory controller is a NAND flash memory controller.

* * * * *